June 9, 1959 M. J. HILLMAN ET AL 2,890,025

PULSE PAIR ENCODER CIRCUITS OR THE LIKE

Filed Dec. 20, 1954 2 Sheets-Sheet 1

MURRAY J. HILLMAN
JAMES M. HEGARTY
*INVENTORS*

BY [signature]

THEIR ATTORNEY

MURRAY J. HILLMAN
JAMES M. HEGARTY
*INVENTORS*
BY
THEIR ATTORNEY

United States Patent Office
2,890,025
Patented June 9, 1959

2,890,025

PULSE PAIR ENCODER CIRCUITS OR THE LIKE

Murray J. Hillman, San Gabriel, and James M. Hegarty, Alhambra, Calif., assignors to Hoffman Electronics Corporation, a corporation of California Application December 20, 1954, Serial No. 476,510

7 Claims. (Cl. 250—27)

This invention is related to pulse pair encoder circuits and, more particularly, to an improved pulse pair encoder circuit which will be extremely reliable in operation and yet will be relatively inexpensive to manufacture.

Many telemetering systems currently in use require some type of transmitted pulse pair encoder signal to prepare an associated receiver for reception of the desired signal. In the main, pulse pair encoding where accuracy is required, is accomplished by means of a suitable magnetostrictive delay line, which are very expensive to manufacture. It is of course true that such a delay line will exhibit a high degree of accuracy both in the wave shape and in the time delay of the "echo" pulse. Yet, their high cost detracts from their usefulness in many systems in which pulse pair encoding is required.

Therefore, it is an object of the present invention to devise a new and useful pulse pair encoder circuit which will be inexpensive to manufacture and yet exhibit a high degree of reliability and performance.

It is a further object of the present invention to provide a new and useful pulse pair encoder circuit which will entail a minimum of component parts and preserve simplicity of design.

According to the present invention, a pulse trigger source is coupled to a first unistable multivibrator which is in turn coupled to the output circuitry. A feed-back loop is coupled from the output side of the aforementioned multivibrator to its input side and includes a second unistable multivibrator and an appropriate series of differentiator circuits. The feed-back loop is so designed as to generate a second pulse, by reason of the differentiated output of the first multivibrator, the time delay of which may be regulated by an appropriate adjustment in the coupling time constant in the second multivibrator stage.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
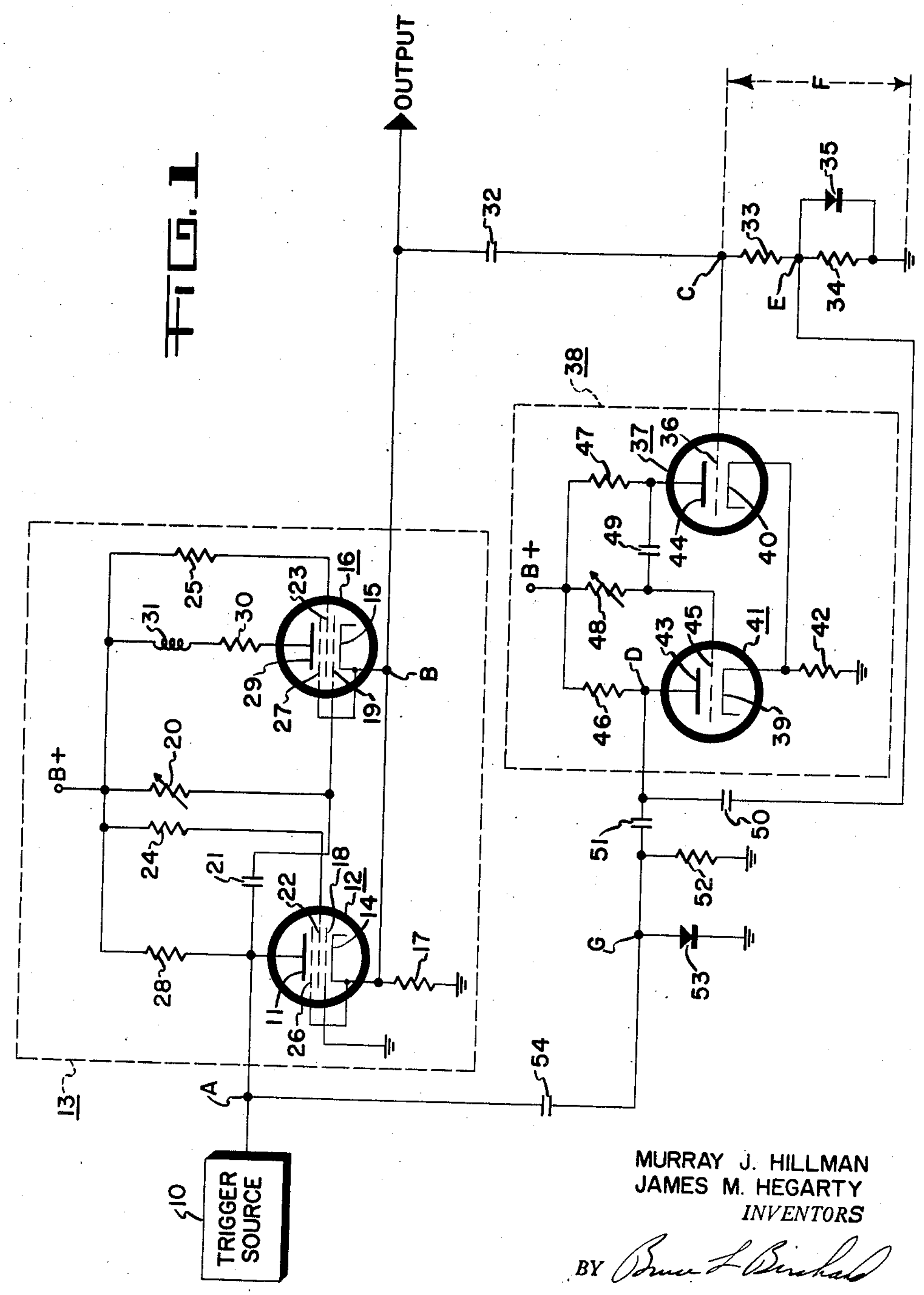
Figure 1 is a schematic diagram of a pulse pair encoder circuit, according to the present invention.

In Figure 1 trigger source 10 is coupled to anode 11 of vacuum tube 12, in cathode-coupled multivibrator stage 13. Cathodes 14 and 15 of vacuum tubes 12 and 16, respectively, are coupled through a common cathode resistor 17 to ground. Control electrode 18 of vacuum tube 12 is maintained at ground potential. Control electrode 19 of vacuum tube 16 is coupled through variable resistor 20 to a source of positive potential (B+), and also to anode 11 of vacuum tube 12 through coupling capacitor 21. Screen electrodes 22 and 23 of vacuum tubes 12 and 16, respectively, are coupled through screen dropping resistors 24 and 25, respectively, to a source of positive voltage (B+). Suppressor electrodes 26 and 27 are coupled to cathodes 14 and 15, respectively, in a conventional manner. Anode 11 of vacuum tube 12 is coupled through anode load resistor 28 to a source of positive potential (B+). Anode 29 is coupled through load resistor 30 and through peaking coil 31 to a source of positive potential (B+). The output signal from multivibrator stage 13 is taken from cathode 15 of vacuum tube 16 and is coupled through coupling capacitor 32 and through resistors 33 and 34 to ground. Resistor 34 is shunted by diode 35. The junction of capacitor 32 and resistor 33 is connected to control electrode 36 of vacuum tube 37, of a second cathode-coupled multivibrator stage 38. Cathodes 39 and 40 of vacuum tubes 41 and 37, respectively, are coupled through common load resistor 42 to ground. Anode 43, anode 44, and control electrode 45 are coupled through resistors 46, 47 and variable resistor 48, respectively, to a source of positive potential (B+). Capacitor 49 couples anode 44 of vacuum tube 37 to control electrode 45 of vacuum tube 41. The output signal from multivibrator stage 38 is taken from anode 43 of vacuum tube 41 and is coupled through capacitor 50 to the junction of resistors 33 and 34 and diode 35. The output signal from multivibrator 38 is also fed to a differentiator circuit consisting of capacitor 51 and resistor 52 which is connected to ground. Diode 53 is in shunt with resistor 52. The output signal from this differentiator circuit is taken across diode 53 and is applied through coupling capacitor 54 to the input circuit of multivibrator 13.

Figure 2:
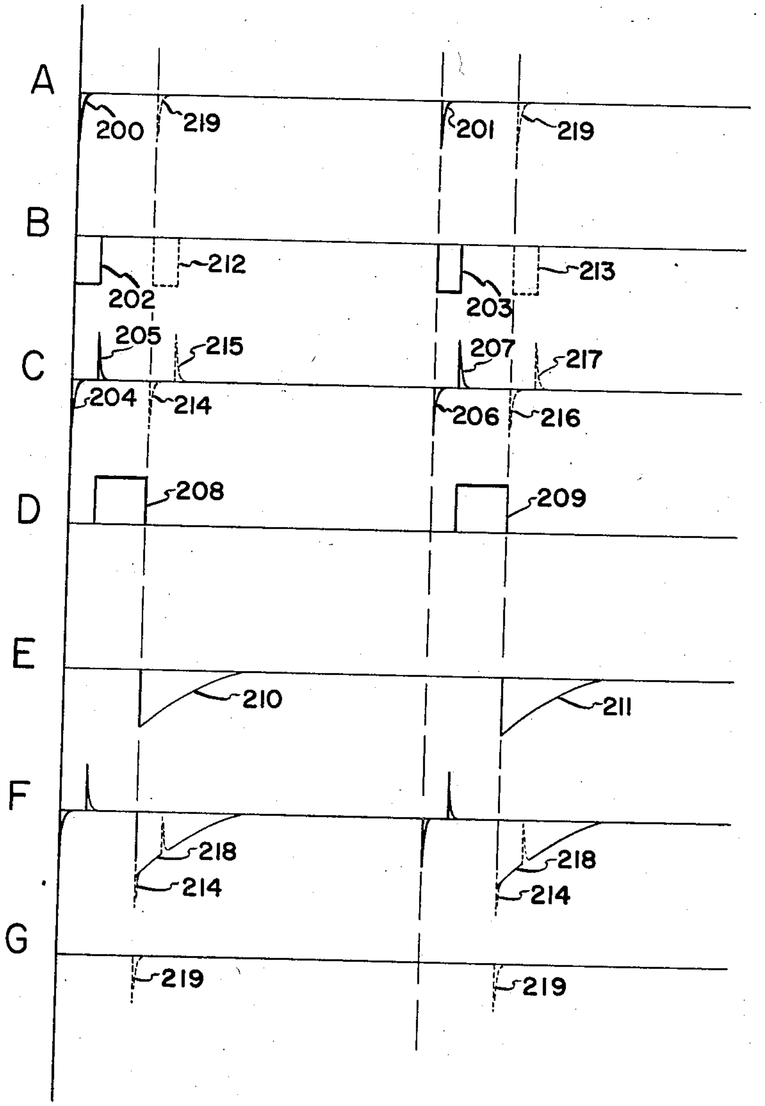
Figure 2 is a pictorial representation of pertinent wave forms which may be found at selected points in the circuit shown in Figure 1.

The circuit as shown in Figure 1 operates as follows. Trigger source 10 may be a blocking oscillator stage or any suitable pulse train source. In the present invention, trigger source 10 is shown to supply a negative pulse train consisting of pulses 200 and 201 as shown in Figure 2. For sake of convenience, all pulses shown in a dotted line configuration will be explained later in this disclosure. The output signal from cathode-coupled unistable multivibrator 13 is taken from cathode 15 of vacuum tube 16, and a sampling of its wave form at point B is shown in Figure 2 by negative square waves 202 and and 203 the pulse width of which may be determined by the appropriate setting of variable resistor 20. The square wave signal from multivibrator 13 is differentiated by capacitor 32 and resistor 33, omitting consideration of resistor 34 for the moment, and the differentiated wave form is sampled at point C in the circuit of Figure 1 and shown as positive and negative pulses 204, 205, 206 and 207, shown in Figure 2. We are considering now only that wave form at point C which exists by virtue of the differentiated wave of the signal taken from multivibrator 13. This differentiated signal is applied to control electrode 36 of vacuum tube 37 of multivibrator 38, which is also a cathode-coupled unistable multivibrator. As shall be shown presently, variable resistor 48 is the device which controls the time delay of the pulse pair. Without doubt, the time constant contributed by resistor 48 and coupling capacitor 49 will determine the time positioning of the trailing edge of pulse 208 and pulse 209, as shown in Figure 2. Wave forms 208 and 209 typify those of the square wave signal as may be sampled at point D in the circuit of Figure 1. This square wave signal from anode 43 of vacuum tube 41 is fed through coupling capacitor 50 and resistor 34 to ground, this R-C circuit being chosen to exhibit a long time constant. As may be seen in Figure 1, resistor 34 is so shunted by diode 35 that the positive rise of pulses 208 and 209 will be shorted out through diode 35 to ground, whereas the negative drop of pulses 208 and 209 will be translated as conventional logarithmic discharge curves as evidenced by the wave form of pulses 210 and 211, taken at point E in the circuitry of Figure 1.

Comparing now the wave forms at point C and point E in the Figure 1 circuit, as shown by the "F" wave forms in Figure 2, it is seen that any square wave pulses following the initial pulse from multivibrator 13 after being differentiated by capacitor 32 and resistor 33 will not be sufficient to overcome the large discharge bias applied to multivibrator 38, by reason of the long time constant contributed by capacitor 50 and resistor 34, so that, after the initial pulse, cathode-coupled multivibrator 38 will be insensitive to triggering for a considerable period of time. The output pulse at point D is differentiated by capacitor 51 and resistor 52, shunted by diode 53, to supply a negative pulse 219 to the input side of multivibrator 13. This pulse 219, or group of pulses 219, which are illustrated in Figure 2 at point A, are indicated by dotted lines. These feed-back pulses of course combine with the negative output pulse train of trigger source 10 to provide a square wave output at point B in the circuit of multivibrator 13 and thus supply a pulse pair output signal, as is illustrated by pulses 202, 203, 212 and 213 in Figure 2.

With this description of the "echo" pulse loop, a discussion of the pulses shown in dotted lines in Figure 2 is greatly facilitated. Feed-back output pulses 212 and 213, as differentiated by capacitor 32 and resistor 33 to form pulses 214, 215, 216 and 217, will not be reflected in the output signal from multivibrator 38 by reason of the fact that positive pulses 215 and 217 (see the wave forms in Figure 2 shown with reference to point F) will be absorbed in the large negative bias pulses 218, and even though negative pulses 214 and 216 at point C occur at a time beyond the effective discharge time of the large negative bias across resistor 34, its negative polarity will not affect the disposition of multivibrator 13, since vacuum tube 37 is normally cut off while vacuum tube 41 is normally conducting. Negative pulses 219 taken from point G are, as has been explained, returned to point A in the trigger source output to combine with the pulses therefrom and hence provide an overall pulse pair output signal.

As has been illustrated, square wave pulse width may be regulated by the appropriate disposition of variable resistor 20, while the delay time in microseconds of the "echo" pulse will be regulated by the suitable adjustment of variable resistor 48.

Construction of the above invention has proved that the circuitry as shown in Figure 1 will incur its manufacturer only a nominal expense in comparison to the relatively large expense of magnetostrictive delay lines. And yet, by virtue of the appropriate selection of circuit elements in parameters, a very stable time delay and an exceedingly sharp rise time will be exhibited by the pulse pair output signal of the applicant's invention.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A pulse pair encoder circuit including, in combination, a trigger source; a first unistable multivibrator having an input circuit, said input circuit being coupled to said trigger source; a first coupling capacitor coupled to said unistable multivibrator; a first impedance coupled to said first coupling capacitor; a second impedance coupled between said first impedance and a common reference potential; a first diode shunting said second impedance; a second unistable multivibrator having an input circuit coupled between the junction of said first coupling capacitor and said first impedance, and said common reference potential, and an output circuit; a second coupling capacitor coupling said output circuit of said second unistable multivibrator with the junction of said first and second impedances and said first diode; a differentiator circuit coupled to the output circuit of said second unistable multivibrator; a second diode shunting said differentiator circuit; a third coupling capacitor; and said differentiator circuit being coupled through said third capacitor to the input side of said first unistable multivibrator.

2. Apparatus according to claim 1 in which said first and second impedances include resistances.

3. Apparatus according to claim 1 in which said first unistable multivibrator is provided with pulse width varying means.

4. Apparatus according to claim 2 in which said first unistable multivibrator is provided with pulse width varying means.

5. Apparatus according to claim 1 in which said second unistable multivibrator is provided with pulse varying means.

6. Apparatus according to claim 2 in which said second unistable multivibrator is provided with pulse varying means.

7. Apparatus according to claim 3 in which said second unistable multivibrator is provided with pulse varying means.

References Cited in the file of this patent

UNITED STATES PATENTS

| | | |
|---|---|---|
| 2,402,916 | Schroeder | June 25, 1946 |
| 2,402,917 | Miller | June 25, 1946 |
| 2,452,549 | Cleeton | Nov. 2, 1948 |
| 2,482,974 | Gordon | Sept. 27, 1949 |
| 2,591,677 | Cleeton | Apr. 8, 1952 |
| 2,835,804 | Luther | May 20, 1958 |